Figure 11:
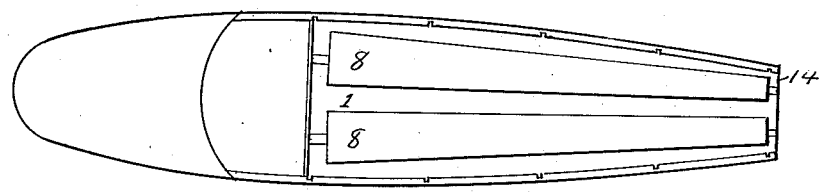

H. E. HAWES.
AEROPLANE AND SAFETY APPLIANCE.
APPLICATION FILED SEPT. 9, 1913.
1,104,889.
Patented July 28, 1914.
3 SHEETS—SHEET 1.
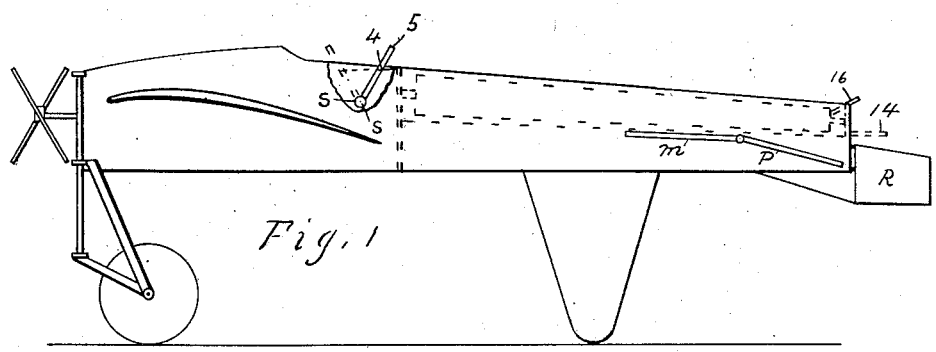
Fig. 1
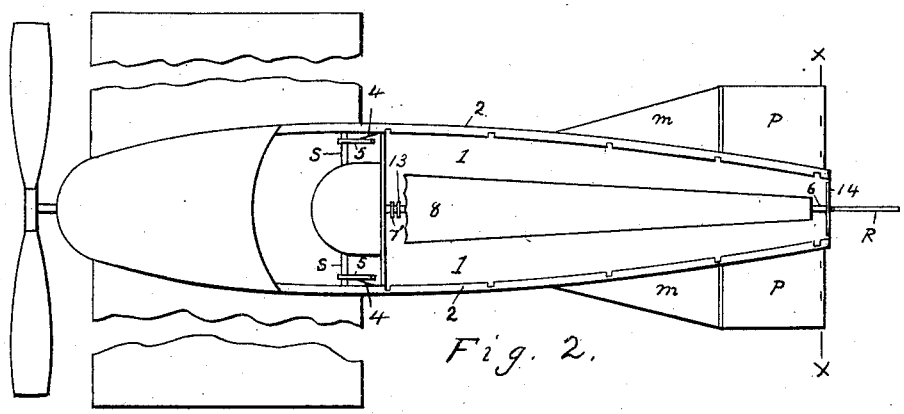
Fig. 2.
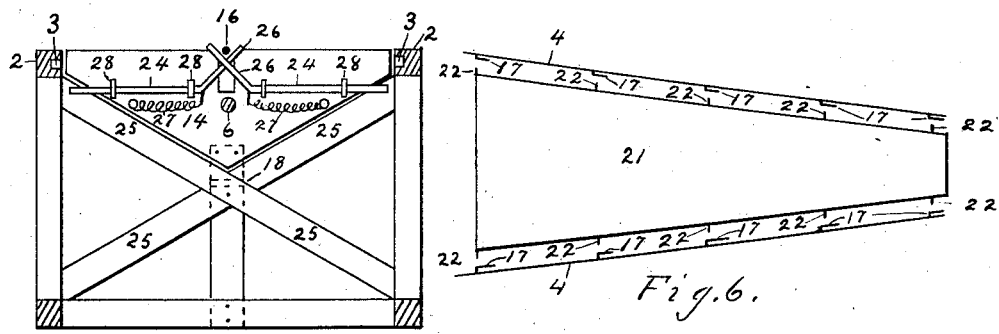
Fig. 3.
Fig. 6.
WITNESSES:
INVENTOR
Herbert E. Hawes

H. E. HAWES.
AEROPLANE AND SAFETY APPLIANCE.
APPLICATION FILED SEPT. 9, 1913.

1,104,889.

Patented July 28, 1914.
3 SHEETS—SHEET 2.

WITNESSES:
C. L. Lazelle
L. F. Hawes

INVENTOR
Herbert E. Hawes

H. E. HAWES.
AEROPLANE AND SAFETY APPLIANCE.
APPLICATION FILED SEPT. 9, 1913.
1,104,889.
Patented July 28, 1914.
3 SHEETS—SHEET 3.
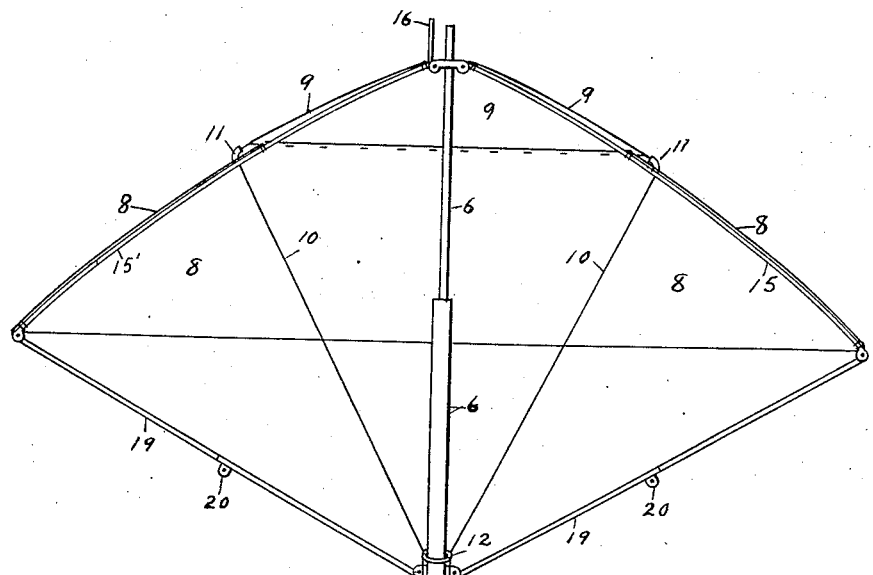
Fig. 5.
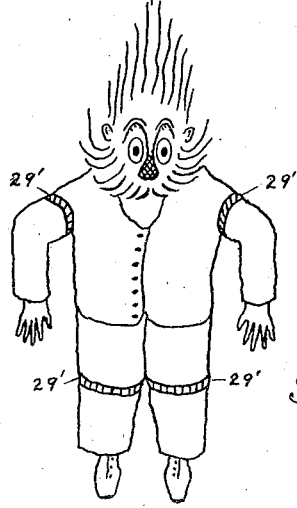
WITNESSES:
C. L. Lozelle
L. G. Hawes
INVENTOR
Herbert E. Hawes

UNITED STATES PATENT OFFICE.

HERBERT E. HAWES, OF NEW YORK, N. Y.

AEROPLANE AND SAFETY APPLIANCE.

1,104,889. Specification of Letters Patent. Patented July 28, 1914.

Application filed September 9, 1913. Serial No. 788,920.

*To all whom it may concern:*

Be it known that I, HERBERT E. HAWES, a citizen of the United States, and resident of Brooklyn borough, in the county of Kings, city and State of New York, have invented certain new and useful Improvements in Aeroplanes and Safety Appliances, of which the following is a specification.

This invention relates to aeroplanes and safety appliances therefor, and has for its object the application to an aeroplane of a parachute, in such manner as to be readily detachable, present no extra head resistance, and to insure the positive opening or spreading of the same, and the safe and expeditious transference of the aviator through the air.

A further object, is to form the parachute with a cover or supporting surface of small dimension on starting, and afterward increase or spread the same to the full capacity or surface of the parachute, when free from the plane. Also to provide a parachute so held and presented that it will be spread automatically, by the forward motion of the machine, and automatically detach itself at a predetermined time or degree of expansion; and other objects will be hereinafter disclosed.

I attain these objects by the construction, arrangement, and combination of parts hereinafter set forth; reference being had to the accompanying drawings, in which like reference characters indicate like parts in all the views.

Figure 8:
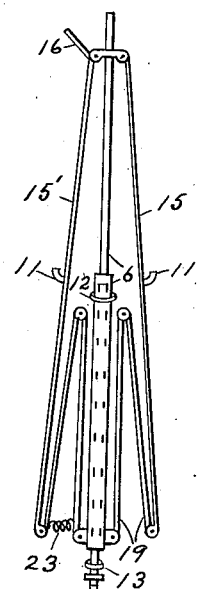
Figure 7:
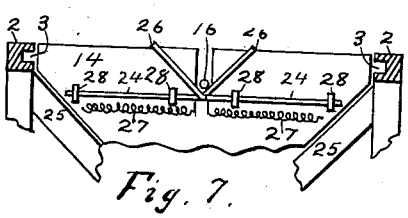
Figure 9:
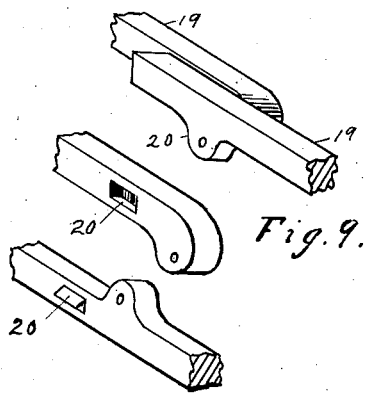
Figure 4:
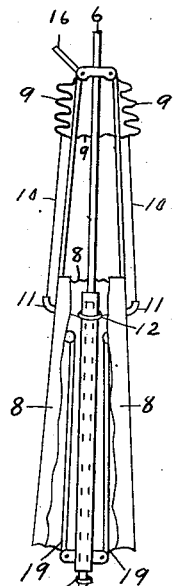
Figure 10:
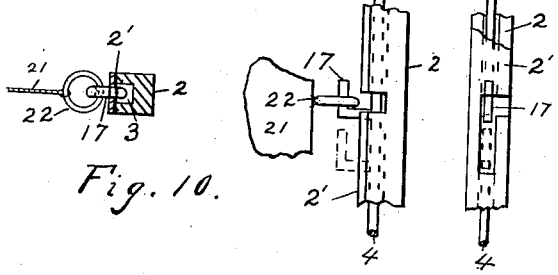

Figure 1, is a general side view of my improvement applied to a monoplane, and shown in dotted outline. Fig. 2, is a plan view, showing the parachute lying in the internal cavity of the frame, with the cavity-cover or wind-shield removed. Fig. 3, is a cross-sectional view at *x—x*, Fig. 2. Fig. 4, is a side elevation of the parachute folded, with the sliding rings at the top of their travel, the extension pushed in, and part of cover removed. Fig. 5, shows the parachute extended with half of the cover removed to show the internal mechanism. Fig. 6, is a plan view of the wind-shield for the frame cavity, its connections to the frame, and details thereof. Fig. 7, is a side elevation of the releasing mechanism for the pivoted gate at the rear end of the cavity; showing bolts 24 released. Fig. 8, is a side elevation in detail of the rib elevating spring, and parachute frame with extension extended, and showing two ribs only. Fig. 9, is a detail of the rib stay-locking mechanism. Fig. 10, is a detail of the wind-shield retaining-catches, and the engagement of the same with the edge of the frame cavity. Fig. 11, shows the frame in outline, plan view, with a plurality of parachutes in the frame cavity.

In carrying my invention into practice, I form the rear of the frame, with a longitudinal, upwardly-opening cavity 1 having a smooth internal surface. The upper side-edges 2 of which are formed with an upper smooth surface extending from the aviator's seat or cockpit rearwardly to the rear of the frame, so that there are no projections to catch the clothing of the aviator, or otherwise injure him as he leaves the machine over the rear. I also lead forward from the ends of the cross supporting-piece of the rear elevating planes P, a stout guy at an angle thereto, and fasten the same to the frame, at a point well forward of said crosspiece. The space on each side inclosed by said guys and the frame, I fill with a sheet of stout material *m*, not liable to rupture by contact with the aviator's feet, as he leaves the machine.

The frame cavity 1, I provide with the inside edges 2 thereof, having a groove 3 for the reception of wires 4 for releasing the sliding catches 17 for the wind-shield 21; said groove extends the full length of the cavity on each side thereof; the wires contained therein being led forward to releasing lever 5, see Figs. 1, 6, 10.

The parachute frame I form with ribs shown in limited number and hinged at the top, to a central staff or handle 6, hollow in the lower part of its length, and containing a sliding telescoping extension 7 having a stop knob 7', to increase the length of the same when released, to render it more stable when in action; the extension movement thereof being limited by stops in any well known way; see Figs. 4, 5, 8. I also form the envelop or cover thereof in duplex parts; one part, the lower 8, I fasten firmly to all the ribs 15 and 15', extending said cover approximately two thirds of the way to the top-center, and leaving a hole in the center of the frame at the top, to lessen its resistance to forward motion while spreading, and to prevent tearing the supporting-surface from the ribs and frame. The other part or hood 9, I form of a circular piece, attaching the center of the same to the ribs adjacent where they are pivoted to the staff; see Fig. 5. To the outside edge of said circular hood, I affix as many spreading-cords 10 as there are ribs, and lead each of the same through a suitable guide or ring 11, affixed to each rib in such position as to insure the hood to completely cover said open space when fully extended. The cords are then led inwardly and fastened to a ring 12 inclosing and slidably-mounted upon the staff 6. From this ring the cords are reduced in number and led downward to a similar ring 13 inclosing the staff below where the stay-ribs are pivoted thereto. The aviator suspension-cords 29 are attached to this latter ring and to the aviator in any well known manner; as by straps 29' around both thighs and shoulders. When the parachute is folded, these rings are slid upwardly toward the top of same, the plain parts of the staff allowing sufficient movement of said rings to fully spread the hood by the weight of the aviator; the hood is folded around the staff at the top of the ribs at the center thereof, and the aviator suspension-cords are led over the partition at the front of the cavity to the aviator's seat. The parachute is preferably held stationary in the cavity in any well known way; as by a recess for each end of the staff, in the bulkhead and gate 14.

A swinging gate 14, see Figs. 1, 3, is pivoted transversely of the frame by its lower edge, and held in an upright position by suitable retaining catches 24, and adapted to be released by mechanism operated by the parachute on partial expansion of the same, as fully hereinafter described. The gate is mounted at the rear of the frame cavity, and serves as a retainer for the parachute, as against the air-pressure on the spreading of the same, until the ribs are sufficiently elevated at the front end or bottom of the parachute, to insure a complete opening, and holds the rear end of staff 6 stationary in the socket in gate 14, as aforesaid, until the gate is swung downwardly.

On spreading, when the ribs lying next the wind shield have received a sufficient elevation, the rib 15' provided with the releasing cam lever 16, see Figs. 1, 5, causes the withdrawal of the retaining catches 24, and allows the gate 14, to swing on its pivot 18, to the position shown in dotted lines Fig. 1, thereby allowing the parachute to leave the machine out of the rear of the frame cavity, whereupon the rest of the ribs assume a fully-spread attitude, and are prevented from closing afterward, by the moving of the stay strips 19 hinged thereto, to a straight line, where snap catches 20 hold them fixed in the extended position; as shown in detail Fig. 9, and Fig. 5 extended.

When the parachute is closed and lying in the cavity 1, a flexible wind-shield 21, covers the top of said cavity and prevents any wind or air-current from entering the inside of the parachute and spreading or disturbing the same. This shield is provided with a plurality of eyes 22, at each edge, which enter openings in rail 2 provided therefor and secure the same to both sides of the frame by means of sliding catches 17 on wires 4, retained in the groove 3 by strip 2' covering groove 2, see Fig. 10. These catches are simultaneously withdrawn from the retaining eyes fast on the shield, which permits the upper ribs of the parachute to rise, when spreading. These upper ribs are assisted to rise, slightly, by springs 23, so as to form an opening at first, for the air-current to enter and spread the parachute.

The catches 17, are connected to wires 4, so as to move simultaneously, see Fig. 6. Said wires are led to the twin lever 5, moved by hand and mounted on transverse shaft $s$, Figs. 1, 2. Movement of this lever into the position shown in dotted lines see Fig. 1, withdraws catches 17, which frees shield 21 from the frame, and allows the parachute to spread.

Two or more parachutes may be carried in the frame cavity, which may be enlarged to carry or accommodate several; see Fig. 11.

It will thus be seen, that the parachute is positively spread and detached; that a too sudden pull or jerk on the aviator or mechanism is avoided, thus lessening the danger of breakage of parts, and discomfort to the aviator.

This mechanism may be used with a hydroplane attachment to the aeroplane, without change, as said mechanism, comes wholly above the hydroplane.

Said gate unlocking mechanism consists of a pair of retractable bolts 24, movably attached to said gate and engaging behind the braces 25, and are provided with cam-ends 26, which are engaged by cam lever 16 on spreading of the parachute, and operate to withdraw said bolts to drop the gate and free the parachute. The sliding bolts are normally retained in locking position by suitable springs 27, and are slidably-fastened to said gate in any suitable manner as by eyes 28, see Figs. 7, 3.

The retaining of the parachute in its receptacle by blocking its rear end against endwise movements, removing the windshield and allowing the same to be forced against the air-current until the uppermost ribs are partially spread, constitutes a very sure and positive way of carrying and spreading the same.

The movable part of the parachute cover may be attached, at option, to either the top or bottom of the parachute ribs, and the fixed part to the opposite end.

This mechanism is shown applied to a well known form of monoplane, which lends itself readily to the application of this mechanism. The rear end of the frame is braced as shown in Fig. 3, and the rear elevating planes are applied as shown in Fig. 2, with the space ahead of the same filled with the stout material as aforesaid, to give an approximately smooth side outline without sharp corners to catch the aviator as he leaves the machine. The bracing strips 25, shown in Fig. 3 are light strips of wood or similar material, which gives ample strength to the rear of the frame. The rear rudder R is placed below the bottom of the cavity, so as to clear the aviator on leaving the rear. The inside of the cavity is formed of some smooth strong material like canvas, or sheet aluminum, and is smooth from end to end.

In applying the springs 23, to assist in raising the upper ribs at first, spiral springs may be used, or any form of spring at option, as only a slight elevation of one or two ribs is necessary to start the spreading, and admit the air-current to the interior of the parachute.

The aviator harness 29 is attached to the aviator in any well known way at option, and the cords from the hood are led to the central shaft and combined in one or more strands, down to the harness, and may contain a resilient piece, as a piece of stout rubber band, to minimize the jerks on starting.

The springs 23 are applied, to lift the ribs, in any suitable way; as between the ribs and central staff 6.

In operating my invention, the parachute is folded snugly with the extension pushed in to the knob 7' to shorten the staff, and laid properly in the cavity 1, with the bottom thereof toward the front of the machine; the aviator suspension cord is next attached to the aviator, and the hood properly folded. The wind-shield is next put in place, the retaining catches locked, the auxiliary springs compressed, and the upright gate secured with the actuating rib in position to unlock the same. To release the parachute, the releasing lever 5, is moved to its forward position see Fig. 1, which sets in operation the shield releasing catches 17. The aviator, now rises in his seat, whereupon the parachute automatically spreads, and takes him safely over the rear of the machine. If two persons are present, with two parachutes, the above applies to both, and the movement of the releasing lever by either liberates both parachutes.

With this mechanism properly made and handled, it will be seen that one or more aviators may safely make a descent from an aeroplane simultaneously and independently: the two parachutes being mounted side by side.

Having thus described my invention, I do not limit it to the exact mechanism shown, as many modifications thereof may be made, by one skilled in the art, without departing from the spirit of the invention.

What I claim as new, and desire to secure by Letters Patent is:

1. In an aeroplane, a frame having a smooth longitudinal upwardly-opening cavity at the rear thereof, a detachable parachute carried in said cavity, the bottom or expansible end of the same disposed toward the front of the machine, an aviator-harness carried by the parachute, a wind-shield for said cavity detachably held to the upper side-edges of said cavity, a series of simultaneously-operable retaining-catches therefor, and means for simultaneously releasing the said retaining catches to detach the parachute.

2. A parachute comprising a central staff, ribs hinged thereto at one end thereof, a partial-cover fixed to said ribs, and a movable partial-cover adapted to be spread over the partially covered ribs, means for drawing or spreading said movable cover to complete the supporting-surface of the parachute, and an aviator harness carried thereby.

3. The combination with an aeroplane having an upwardly-opening rear cavity, of a parachute carried and retained therein in a horizontal position with the bottom thereof toward the front of the plane and having a cover or supporting-surface in two parts, the fixed or primary part operating to move or launch the parachute from the plane in a gradual or progressive manner and the secondary or movable part adapted to be spread to complete the full extent of the supporting surface after launching, means for retaining the parachute in the cavity, and means for releasing the said retaining means.

4. The combination with an aeroplane having a horizontal longitudinal rear upwardly-opening cavity provided with a removable cover, of means for releasing said cover, a plurality of parachutes carried in said cavity with the bottoms thereof presented toward the front of the plane, a central staff for each, ribs hinged thereto at one end and adapted to be partially expanded or spread while lying in said cavity, an aviator harness connected to each of said parachutes, and means for disconnecting said parachutes from the 'plane simultaneously.

5. In an aeroplane, a frame having a rear upwardly-opening longitudinal cavity, a wind-shield therefor detachably-held to the upper side-edges of said cavity, retaining catches therefor, a parachute carried in said cavity, an aviator-harness carried thereby, manually-actuated means for releasing the retaining catches of the wind-shield, and means for retaining the rear end of the parachute in the cavity until the same is partially spread.

6. In an aeroplane, a frame having a longitudinal upwardly-opening cavity in the rear thereof, a detachable wind-shield forming a top or cover for said cavity, a plurality of retaining catches for said cover, manually actuated means for simultaneously unlocking said retaining catches, a movable gate pivoted at its bottom edge transversely at the rear end of said cavity, retaining catches for holding said gate upright, a parachute carried in said cavity having umbrella-like ribs adapted to be spread by internal air-pressure, means operated by the parachute to unlock the retaining catches of the movable gate to free the parachute, and an aviator-harness carried by the parachute.

7. In an aeroplane, a frame having a longitudinal upwardly-opening cavity in the rear thereof, a parachute detachably held in said cavity and adapted to be spread by movement against the air-current, means for retaining the parachute in said cavity, suspensory connections for the aviator attached to the parachute, and means automatically actuated to release the parachute retaining means after a predetermined amount of spreading of the parachute is attained.

8. In a parachute, a central staff, ribs hinged thereto at one end, a partial sustaining-surface fixed to the free ends of the ribs for part of their length and leaving an open space at the hinged ends thereof, a movable sustaining-surface adapted to be spread over the aforesaid open space, connections or cords for so moving the movable sustaining-surface over said space and operated by the weight of the aviator, and an aviator-harness carried by the parachute and attached to said cords.

9. The combinations with an aeroplane, of a detachable parachute having a partial supporting-surface fixed thereto and leaving a hole at the top, a supplementary movable supporting surface for said hole, connections or cords for drawing said movable surface over the said open space of the parachute, an aviator-harness affixed to said cords, and means to detach the parachute from the aeroplane.

10. In an aeroplane, a frame having a longitudinal horizontal cavity in the rear of the fuselage, a fixed end in the front of said cavity, a movable end in the rear of said cavity, a cover or top therefor having retaining catches engaging the top side-edges of said cavity, manually-actuated means for simultaneously unlocking said retaining catches, a parachute having a central staff and ribs hinged thereto at one end, compression springs adapted to raise the uppermost ribs upon release of said cover, a duplex cover for the parachute frame one part fixed thereto the other part adapted to be spread or positioned after the release of the parachute, an aviator harness connected to the movable part of the parachute cover and engaging with the central staff, and means actuated by the spreading of the parachute ribs to release the movable rear end of the cavity when the ribs are partially extended; said parachute being mounted with the bottom toward the fixed end of the cavity.

11. A parachute having a supporting surface in two parts, the one part adapted to be expanded and positioned by the air current, and the other part adapted to be expanded by the combined resistance of the air-current and the coöperation of the weight of the aviator operating to spread the last named part after launching through connections affixed thereto and connected to an aviator-harness.

12. The combination with an aeroplane frame having a rear upwardly-opening cavity, a detachable wind shield for the top of said cavity, detachable retaining-catches for said shield, manually-actuated means for unlocking said retaining-catches, of a detachable parachute having ribs hinged at the top center thereof carried in said cavity with the bottom thereof presented toward the front of the machine and having a duplex supporting-surface adapted to be increased in extent after spreading, an aviator-harness carried by said parachute, and means to detach the parachute.

13. The combination with an aeroplane having a horizontal rear upwardly-opening cavity, a top or cover therefor, means for releasing said cover, of a parachute carried horizontally in said cavity and having spring-pressed ribs adapted to be raised thereby on release of said cover while the parachute is still retained in said cavity, an aviator harness attached to the parachute, and means to release the parachute.

14. The combination with an aeroplane having a longitudinal horizontal upwardly-opening cavity in the frame, a fixed end in the front of said cavity and a movable end in the rear thereof, a frame parachute detachably held in said cavity with its expansible end disposed toward the front of the machine, a covering or supporting-surface therefor in parts one part fixed to the frame of the parachute the other part movable relative thereto and adapted to be spread partially thereover, spreading cords or connections therefor connected to an aviator-harness, of means for moving the rear end of the cavity after partial spreading of the parachute to release the same from the machine.

15. The combination with an aeroplane having a rear substantially airtight horizontal cavity with a detachable cover therefor, of a detachable parachute having hinged ribs and a duplex cover carried in said cavity and adapted to be partially spread by motion against the air while attached to the plane, means to detach said cover, and means to detach the parachute; said parachute having an aviator harness attached thereto.

16. The combination with an aeroplane, of a detachable parachute carried thereby and having a partial fixed cover therefor and a supplementary movable cover adapted to be spread after the launching thereof, means to detach the parachute, and an aviator-harness attached thereto.

17. The combination with an aeroplane having a smooth free upper rear surface, of a detachable parachute having a partial fixed and a partial movable cover carried thereby and adapted to take the aviator therefrom over said rear upper surface, an aviator-harness attached to said parachute, and means to detach the parachute.

18. The combination with an aeroplane, of a plurality of independent detachable parachutes carried thereby, an aviator-harness attached to each parachute, and means to detach said parachutes; said means comprising a transverse shaft having twin releasing levers one at each end.

19. The combination with an aeroplane having an upwardly-opening cavity in the rear thereof, a detachable cover for said cavity, means to detach said cover, a plurality of detachable independent parachutes carried in said cavity and having an aviator-harness attached to each, of means to simultaneously detach said parachutes from the cavity; said means comprising a releasing lever located adjacent to the separate aviator seats.

20. An aeroplane with a rear upwardly-opening cavity with a fixed partition in the front end of said cavity and a movable partition or gate in the rear thereof, means for moving said rear gate, said gate being adapted to be moved entirely out of line with interior of said cavity.

21. The combination with an aeroplane having a smooth-surfaced rear upwardly-opening cavity, parachute retaining means coöperating therewith, of a parachute carried therein and having an aviator-harness attached thereto and adapted to be partially filled or expanded while still retained in said cavity, and means to release the parachute retaining means.

22. A parachute having a compound supporting surface or cover in parts, one part adapted to be spread by the air current or air resistance, the other part to be spread by the combined air-resistance and weight-actuated connections, cords or connections attached thereto for transmitting said weight impulse, and an aviator-harness attached to said connections.

23. A parachute having a central telescoping staff, ribs hinged thereto at one end, folding rib-stays therefor, a duplex cover therefor, one section affixed to parts of said ribs, the other section movable and adapted to be spread or positioned after launching, cords for spreading said movable section of cover, and an aviator-harness affixed to said cords.

24. A framed parachute having a duplex supporting-surface the one part of said cover fixed to the frame thereof, the other part movable relatively thereto and adapted and arranged to be spread by the weight of the aviator after launching, cords or connections for spreading said movable cover, and an aviator-harness attached to said parachute.

25. The combination with an aeroplane having an internally-smooth rear upwardly-opening cavity, a front partition therefor and a movable rear partition, parachute retaining means carried by said partitions, a parachute carried in said cavity with the bottom thereof presented toward the front of the plane, an aviator-harness connected thereto, of means for releasing the parachute retaining means.

26. In a parachute, a central staff, a cover or supporting surface therefor in parts, the lower part fixed or unadjustable as to position, the other or upper part movable and adapted to be positioned after launching by the combined action of the air-resistance and the weight of the aviator acting through spreading cords or connections attached to an aviator-harness, connection-eyes or guides mounted on the parachute to receive guide and position said cords for moving the movable part, and an aviator-harness carried thereby; said connections extending toward and leading to the center of resistance of the parachute.

In testimony whereof I have hereunto signed my name in the presence of two subscribing witnesses.

HERBERT E. HAWES.

Witnesses:
 JOHN E. F. FAGAN,
 FRED E. MAYOR.